United States Patent [19]

Thompson

[11] 4,028,956

[45] June 14, 1977

[54] TRANSMISSION BELT

[75] Inventor: Lawrence M. Thompson, Lancaster, Pa.

[73] Assignee: The Arbee Corporation, Manheim, Pa.

[22] Filed: Nov. 1, 1976

[21] Appl. No.: 731,459

Related U.S. Application Data

[63] Continuation-in-part of Ser. No. 616,768, Sept. 25, 1975, Pat. No. 4,009,620.

[52] U.S. Cl. ................................................. 74/236
[51] Int. Cl.² ........................................ F16G 51/80
[58] Field of Search .................. 74/236, 235, 231 R

[56] References Cited

UNITED STATES PATENTS

| 2,756,604 | 7/1956 | Wiker, Jr. | 74/236 |
| 2,969,686 | 1/1961 | Runton | 74/236 |
| 3,154,960 | 11/1964 | Creswell | 74/236 |
| 3,154,961 | 11/1964 | Creswell | 74/236 |
| 3,269,523 | 8/1966 | Creswell | 74/236 |
| 3,375,726 | 4/1968 | Jones et al. | 74/236 |
| 3,991,632 | 11/1976 | Stephens | 74/235 |

Primary Examiner—Leonard H. Gerin
Attorney, Agent, or Firm—Dorfman, Herrell and Skillman

[57] ABSTRACT

A transmission belt comprising a series of links arranged in superimposed successive overlapping relation secured together by interlocking the links without separate fasteners and composed principally of a homogeneous synthetic material. The links are made of Hytrel, an E. I. duPont de Nemours & Co. segmented thermoplastic copolyester.

9 Claims, 13 Drawing Figures

TRANSMISSION BELT

This application is a continuation-in-part application of U.S. Pat. application Ser. No. 616,768 filed Sept. 25, 1975, now U.S. Pat. No. 4,009,620 issued Mar. 1, 1977.

The present invention relates to transmission belts for use both for power transmission and for conveying and, more particularly, to driving belts of the type comprising a number of superimposed links secured together by interlocking the links without separate fastening means, for example by tab portions of the links which pass through openings formed in the adjacent links.

The present invention has particular application to V-belts for use in environments where the belts are subjected to severe conditions of heat and moisture during their operation, and specifically washing apparatus where the belts are exposed to water, dirt, grease or the like, such as, for example, meat processing apparatus, and seamless-can-manufacturing apparatus in which freshly-drawn cans are conveyed between opposing runs of transmission belts while flooded with coolant and/or the drawing lubricant.

In meat processing apparatus, the meat may be subjected to baths or sprays at elevated temperature. The transmission means are positioned within the housing of the apparatus so that they are exposed to the harsh conditions within the apparatus housing, including not only the elevated temperature and moisture conditions of the sprays, but also to animal fats of the material being processed at the elevated temperatures.

Interlocking-link type transmission belts are particularly adapted for use in apparatus where it is desirable to avoid the use of fasteners or other metallic parts. Such parts may corrode and fail under harsh operating conditions; in food-processing apparatus, metallic shavings or spurs may contaminate the food product; in can manufacturing apparatus, metallic parts may damage or mar the surface of the freshly-drawn cans prior to lithographing; and in apparatus operating in an explosive or flammable atmosphere, the metallic parts may generate sparks which might ignite such atmosphere.

Prior link belts of this character have not been entirely satisfactory for use in the hot, moist and/or oily or greasy conditions within food-processing apparatus because of the fact that the links of such belts are normally composed of a multi-ply fabric laminated structure whose integrity is maintained by a suitable bonding agent permeating the laminated structure. Links of this character have been proved highly successful for use in normal operating environments but in the hot, moist and/or oily and greasy environments, there is a tendency for the plies of the links to separate and there is a relatively short operating life for such belts. However, they are used because their advantages outweigh such disadvantages.

Furthermore, the conventional fabric-reinforced links, when they become wet, tend to swell and stretch, which affects the tension in the belt. The use of link belts in a wet environment is not normally recommended.

Previous attempts to improve the life span of interlocking link-type belts operating under extreme conditions have been to provide a secondary locking tab, or to add supplemental reinforcement to retard the escape of the end tab of one link from the receiving apertures of the adjacent links. Additional effort was directed toward improving the material in the laminated structures, such as the fabric component of the structure and the bonding material used to integrate the plies of the structure into a unitary link.

Previous attempts to find a suitable substitute for the multi-ply fabric laminated structures have met with failure.

With the foregoing in mind, the present invention provides a novel interlocking-link-type driving belt which has been discovered to have an extended life in use which is substantially longer than the life of belts using standard material.

The belt uses links fabricated from a homogeneous material which is preferably devoid of fabric reinforcement.

The belt of the present invention is comprised of links which may be fabricated using standard simplified stamping or molding techniques and which may be assembled in the factory or in the field to provide a belt of high durability.

When molded, the links may be formed in a single-step into any one of several configurations, which may be designed to accommodate a specific condition of use.

All of the objects of the present invention and the various features and details of the construction and operation thereof are more fully set forth hereinafter and described with reference to the accompanying drawing, in which.

Figure 1:
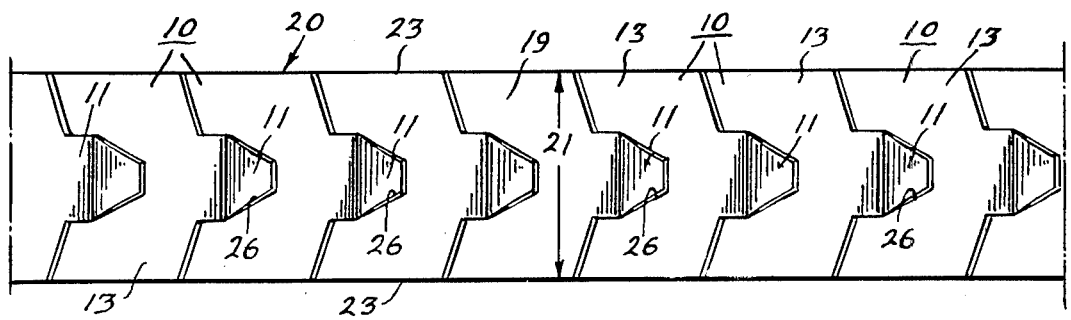
FIG. 1 is a plan view of length of transmission belting embodying the present invention.
Figure 2:
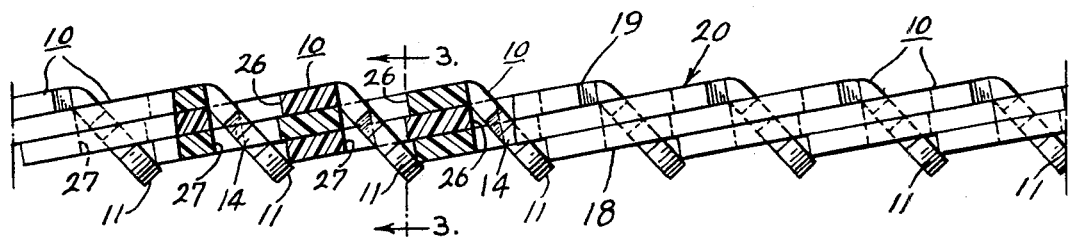
FIG. 2 is a side elevational view of the belt shown in FIG. 1 with portions broken away to show details of the construction of the belt.
Figure 3:
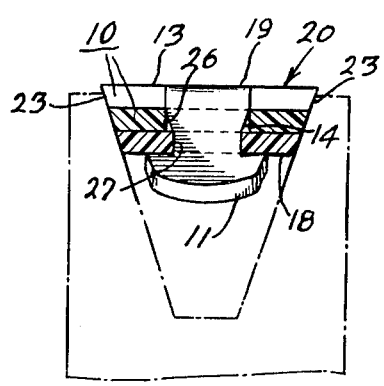
FIG. 3 is a transverse sectional view taken on the line 3—3 of FIG. 2 showing a sheave in broken lines to illustrate the operation of the belt.

Referring now to the drawing and more particularly to FIGS. 1 and 2 thereof, the belt 20 comprises a plurality of superimposed links 10 joined together by integral fastening means. Each fastening means comprises a locking tab 11 joined to the body 13 of the link 10 through a constricted neck 14. As illustrated in FIGS. 2 and 3, the locking tab 11 is spaced a sufficient distance apart from the body 13 to receive therebetween two of the links 10.

Figure 4:
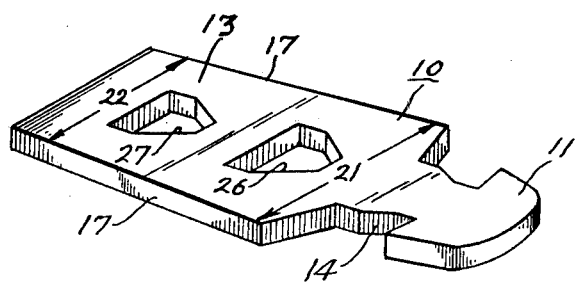
FIG. 4 is a perspective view of a link of the belt in a flat condition prior to assembly.

The links 10 are provided with registering apertures for receiving the locking tabs 11 and the neck 14 of preceding links 10 as they are assembled in superimposed relation. As shown in FIG. 4, the links 10 are provided with forward apertures 26 and trailing apertures 27. When the links are assembled in successive superimposed overlapping relation, the trailing aperture 27 is in registry with the forward aperture 26 of the adjacent link, so that the locking tab 11 of the overlapping link first passes sideways through the forward aperture 26 of the adjacent link and then through the trailing aperture 27 of the innermost link, and then is twisted to bear against the inner surface 18 of the innermost link. For ease of belt assembly, both of the apertures are longer in the axial direction than they are wide so that the locking tab 11 of the link to be assembled in superimposed relation, when twisted so as to align axially with the apertures, will more easily pass through the apertures. When the locking tab 11 is released from its twisted position, it aligns cross-wise with the belt 20 in a position perpendicular to the longitudinal axis of the links 10 and since the width of the apertures is less than the length, the locking tab 11 is unable to pass through the apertures and thus is locked in position against the inner surface of the innermost link as shown in FIG. 3.

FIG. 3 shows a preferred embodiment of the belt, with locking tab 11 on the inner periphery 18, when in operation in a typical V-belt sheave. As shown in FIG. 4, the head portion 21 of the link 10 is wider than the tail portion 22, thus facilitating the natural curvature of the superimposed links 10 by placing the widest portion of the link 10 on the outer periphery 19 of the belt 20. Thus, by making the head portion wider than the tail portion, the longitudinal centerline of the links automatically assume a convex curvature upon assembly in successive superimposed overlapping relation.

As the locking tabs are passed through successive links and then terminate, their tendency when the belt is tensioned is to dispose themselves parallel to the link by flattening out. In the belt 20, when the tabs lie on the inner periphery 18 of the belt, the outer periphery 19 contains the head portion 21, and since the outer periphery 19 of the belt 20 is wider at any point than that portion of the adjacent or intermediate link, and the intermediate link in turn is wider at that point than the tail portion 22 of the innermost link, the belt assumes a V-shaped cross-section with the tab 11 in the apex of the V-shape, as illustrated in FIG. 3.

Despite the fact that the superimposed links are generally V-shaped in cross-section, the edges 17 of the V would be stepped. Therefore, in the final form and after assembly, the edges of the links are trimmed to provide a bevel to insure proper seating in the associated sheaves. FIGS. 3 illustrates, as an example, the trimmed sides 23 of the belt 20 and FIG. 1 shows the trimmed straight outer edges formed by the sides 23.

The links 10 are fabricated from homogeneous material which is devoid of fabric lamination. The elimination of the fabric lamina, which have been characteristic of commercially-available belt links of the prior links of the prior art, is believed to contribute to the durability and operational life of the transmission belts of the present invention. As stated above, the belts of the present invention are designed for use in an environment where conventional commercially-available link belts are not entirely satisfactory. In a particular application, the transmission belt of the present invention is used in meat-processing apparatus in which the belt itself is subjected not only to moisture and heat, for example water at 120° F, but also to animal fats. The transmission belts are used with V-pulleys and the operation of the transmission belts subjects them to a wide variety of stresses and strains. Elimination of the fabric lamina from the links 21 is believed to permit the use of a material which is highly resistant to the damage from the severe conditions within the apparatus.

The present invention provides a link belt consisting principally of homogeneous material, and it has been found that the homogeneous material must comprise segmented thermoplastic copolyesters containing recurring long chain ester units derived from dicarboxylic acids and long chain glycols and short chain ester units derived from dicarboxylic acid and low molecular weight diols. The composition is a thermoplastic polyester elastomer which is commercially available from E. I. duPont de Nemours & Co., Inc., under the registered trademark "Hytrel" and is described in U.S. Pat. Nos. 3,651,014; 3,763,109 and 3,766,146.

It has been discovered that in fabricating a link of the type shown in the drawing for use in an interlocking-link belt having integral fastener portions passing through successive apertures in succeeding links, a segmented thermoplastic copolyester of the type set forth should have a durometer above 40D (92A) and less than 72D. The preferred durometer has been found to be approximately 55D for use in link belts, as shown in the drawings.

Figure 5A:
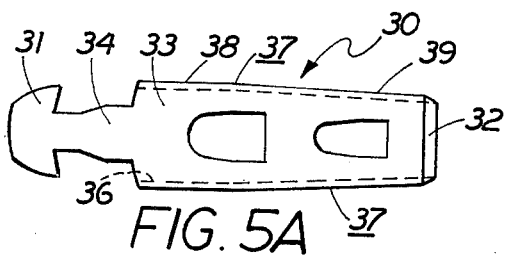
FIGS. 5A, 5B and 5C are top, end and side elevational views of a shaped link similar to the link of FIG. 4 but having pre-formed bevels along the sides and tail.
Figure 5B:
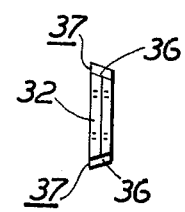
Figure 5C:
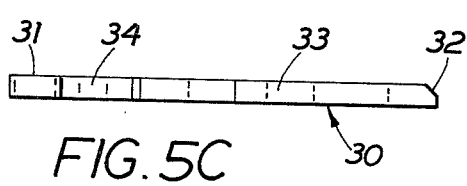

The links formed of the segmented thermoplastic copolyester of the present invention are readily susceptible to being trimmed after assembly into the belt to provide the beveled edges which are aligned to provide the straight edges 23 of the assembled belt, as shown in FIGS. 1 and 3. However, the thermoplastic material of the present invention also is susceptible of being pre-formed to produce comparable characteristics in the assembled belt. For example, as shown in FIGS. 5A, 5B and 5C, a link 30 may be pre-formed by molding or die-cutting to provide a locking tab 31, a body 33 and a neck 34 comparable to the tab 11, body 13 and neck 14. However, in the forming operation, the side edges 37 are pre-formed parallel to each other at the head end, as indicated at 38, and convergent at the tail end, as indicated at 39. This formation provides straight edges 23 in the assembled belt as shown in FIG. 1. Furthermore, the edges 37, 37 are also undercut to provide a slight bevel, as indicated at 36. The angle of the bevel 36 in the respective portions 38 and 39 is selected to insure proper seating in the associated V-sheaves without trimming. In the formation of the link 30, it may also be preferred to bevel the tail of the link as indicated at 32 to provide a smoother undersurface in the assembled belt. The illustrated configuration is readily accomplished by the use of a suitable die in the process of forming the link.

Figure 6A:
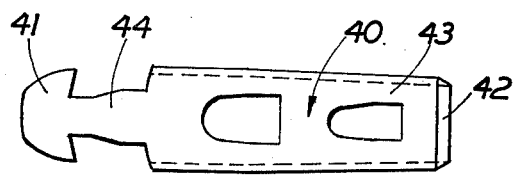
FIGS. 6A, 6B and 6C and FIGS. 7A, 7B and 7C are views similar to FIGS. 5A, 5B and 5C showing other forms of pre-formed shaped links in accordance with the invention.
Figure 6B:
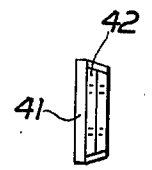
Figure 6C:
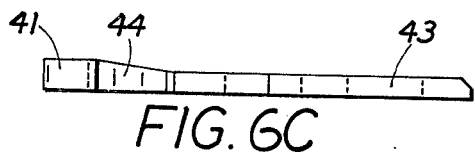

FIGS. 6A, 6B and 6C show a further modification of the link shown in FIGS. 5A, 5B and 5C. The link 40 shown in these figures includes a locking tab 41 at the head, a neck 44, a body portion 43 and a beveled tail at 42. The side edges of the body portion 43 are formed identically to the side edges 37 of the body portion 33. In this embodiment of the link, the locking tab 41 at the head is formed with a substantially greater thickness than the body portion 43. As shown in FIG. 6C, the locking tab 41 is substantially thicker than the body portion 43 and the neck 44 tapers in thickness from the thickness of the tab 41 to the thickness of the body portion 43. The tab thickness is less than the width of the apertures to facilitate assembly. This configuration of link is particularly adapted for use in belt assemblies in which there is a substantial tendency for the locking tab to flex and pull through the receiving apertures of the adjacent links. The enlarged thickness of the tab 41 resists such flexing and assists in maintaining the integrity of the belt assembly. Such a link is conveniently fabricated by the proper selection of a suitable die configuration in an injection molding operation.

Figure 7A:
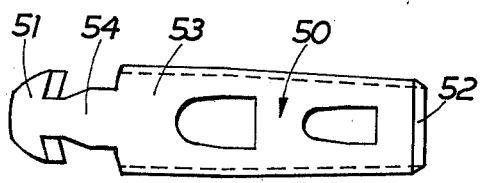
Figure 7B:
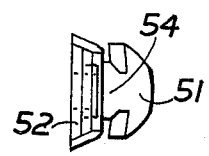
Figure 7C:
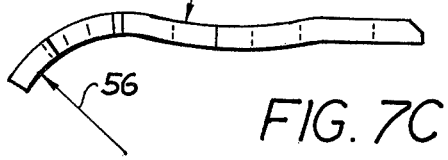

FIGS. 7A, 7B and 7C illustrate a link 50 which is pre-formed with a curvature conforming closely to the curvature assumed by the link when assembled in a belt and tensioned, as shown in FIGS. 1 and 2. As shown in these figures, the link 50 includes a locking tab 51, a neck 54, a body portion 53 and a beveled tail at 52. In this embodiment, the portions are of substantially uniform thickness throughout. However, the body portion 53 is pre-formed or permanently set with a shallow dished curvature centrally thereof as indicated by the radius at 55, and the neck 54 and locking tab 51 are curved downwardly with a curvature, as indicated by the radius 56. It should be noted that the radius 56 is substantially smaller than the radius of the curvature 55, so as to conform the link closely to the curvatures naturally assumed by the link when it is assembled into a belt and tensioned. The side edges of the link 50 are shaped similarly to the side edges 37, as is evident in the drawing. The link may be formed and set in a single operation, as discussed above, or may also be formed and set in sequence.

The embodiment of FIGS. 7A, 7B and 7C is particularly suitable where the tension of the belt is critical. With the belt of this embodiment, when the arcuate links are assembled, the tendency of the belt to elongate in use is minimized. With the flat links, the stiffness of the link tends to foreshorten the belt when the belt is new and it requires considerable additional tension to straighten the belt to the condition shown in FIG. 1. With the links pre-formed as shown in FIGS. 7A, 7B and 7C, the curvature set into the links assists in the assembled belt assuming the flat configuration shown in FIG. 1. Thus, as the belt is used, the length and tension of the assembled belt remain substantially constant throughout the life of the belt.

The links of the present invention are susceptible of being injection-molded in any particular configuration desired. Alternatively, the sheet may be die-stamped to provide the desired configuration, the thermoplastic character of the material affording wide latitude in the selection of appropriate manufacturing techniques. It should be noted that inasmuch as the links may be molded to their ultimate shape prior to assembly in the belt, all of the links of the belt are indentical in configuration. Thus, when it becomes necessary to repair the belt, as by replacing a link in the field, the link inserted in the belt (having been formed to the exact configuration of the link which it replaces) will align with the side edges of the remaining links and will seat properly in the sheaves without the need for trimming or other forming operations. These links therefore avoid the problems of non-uniform trimming of the belts which is inherent in the conventional two-step process of the prior art. Furthermore, the use of molding techniques to form the bevels generates a molded-surface condition on the bevels which is characteristically distinct from the trimmed-surface condition generated by a separate trimming operation.

Transmission belts made in accordance with the invention are particularly suited for use in wet processing apparatus where the belt is exposed to hot water, coolants and/or drawing lubricants. The links of the present invention resist retention of the liquid and thereby retain their dimensional stability whether wet or dry. The belt is particularly adapted for use in can manufacturing apparatus wherein the freshly-drawn cans are conveyed between V-belts running around V-sheaves. Such belts are highly sensitive to variations in tension, and slack in the belt tends to permit disengagement from the sheave. The present invention provides a belt resistant to stretching and thereby tends to preserve the proper tension in the V-belts so as to reduce the tendency of the belts to disengage from their pulleys.

While particular embodiments of the present invention have been herein illustrated and described, it is not intended to limit the invention to such disclosures but changes and modifications may be made therein and thereto within the scope of the following claims.

I claim:

1. A transmission belt comprising a series of links arranged in superimposed successive overlapping relation, each of said links having a body portion with at least two longitudinally-aligned apertures, and an integral fastening means comprising a laterally constricted neck portion and a locking tab connected to said body portion through said neck portion, said integral fastening means being longitudinally aligned with said apertures and extending through a forward aperture in the succeeding link and a trailing aperture in the next succeeding link whereby said plurality of links are secured together in overlapping relation to thereby form a belt, said body portion, neck portion and locking tab comprising a homogeneous material consisting of a segmented thermoplastic polyester containing long chain polyester units derived from dicarboxylic acid and long chain glycol and short chain ester units derived from dicarboxylic acid and low molecular weight diol and having a durometer higher than 40D (92A) and lower than 72D.

2. A transmission belt according to claim 1 wherein said body portion is of substantially uniform thickness throughout, and said locking tab is substantially thicker than said uniform thickness, and wherein further the length of said constricted neck portion exceeds the combined thicknesses of the body portions of said plurality of overlapped links.

3. A transmission belt according to claim 2 wherein the transverse width of said apertures is less than the width of said locking tab, greater than the width of said constricted neck portion and greater than the thickness of said locking tab and the length of said apertures is greater than their transverse width to afford passage of said locking tab sideways through said apertures during assembly of said belt.

4. A transmission belt according to claim 3 wherein said restricted neck portion tapers in thickness from the thickness of said locking tab to the thickness of said locking portion.

5. A transmission belt according to claim 1 wherein said integral fastening means of each link has a permanent set curving downwardly away from the exposed surface intermediate said forward aperture and said neck portion.

6. A transmission belt according to claim 1 wherein all of said links are identical in configuration, each link having a body portion with downwardly directed bevels along the side walls and an upward facing bevel across the tail end remote from said constricted neck.

7. A transmission belt according to claim 6 wherein said side walls of said body portion adjacent said constricted neck extend parallel to the longitudinal center line of said link, and adjacent said tail end converge towards one another in the direction of said tail.

8. A transmission belt according to claim 6 wherein said beveled surfaces have a molded surface condition throughout.

9. A method of making an interlocking-link type transmission belt comprising the steps of molding a plurality of individual links from a homogeneous material consisting of a segmented thermoplastic polyester constaining long chain polyester units derived from dicarboxylic acid and long chain glycol and short chain ester units derived from dicarboxylic acid and low molecular weight diol and having a durometer higher than 40D (92A) and lower than 72D, all of said links being identical and having a body portion with at least two longitudinally-aligned apertures, and an integral fastening means comprising a laterally constricted neck portion and a locking tab aligned with said apertures, said apertures having a width less than the width of said locking tab, greater than the width of said neck and greater than the thickness of said locking tab, and assembling said links into a belt by disposing said links in superimposed succession overlapping relation and interlocking said links by passing the locking tab of each link sideways through the forward aperture in the succeeding link and a trailing aperture in the next succeeding link and twisting the tab to bear against the surface of the link surrounding said trailing aperture to thereby interlock said links to form a transmission belt.

* * * * *